J. G. MacPHERSON.
CHANGE SPEED MECHANISM FOR MOTOR VEHICLES AND THE LIKE.
APPLICATION FILED FEB. 12, 1915.

1,160,922.

Patented Nov. 16, 1915.
4 SHEETS—SHEET 1.

UNITED STATES PATENT OFFICE.

JOHN G. MacPHERSON, OF PHILADELPHIA, PENNSYLVANIA, ASSIGNOR, BY DIRECT AND MESNE ASSIGNMENTS, OF ONE-THIRD TO MILLARD F. METCALF, OF PITTSBURGH, PENNSYLVANIA, AND TWO-THIRDS TO JOSEPH C. BAIRD, OF WASHINGTON, PENNSYLVANIA.

CHANGE-SPEED MECHANISM FOR MOTOR-VEHICLES AND THE LIKE.

1,160,922.          Specification of Letters Patent.        Patented Nov. 16, 1915.

Application filed February 12, 1915. Serial No. 7,823.

*To all whom it may concern:*

Be it known that I, JOHN G. MACPHERSON, a citizen of the United States, residing at Philadelphia, county of Philadelphia, and State of Pennsylvania, have invented certain new and useful Improvements in Change-Speed Mechanism for Motor-Vehicles and the like; and I do hereby declare the following to be a full, clear, and exact description of the invention, such as will enable others skilled in the art to which it appertains to make and use the same.

This invention relates to change speed mechanism for motor vehicles, and particularly to change speed mechanism involving the use of pneumatic means for effecting the shifting movements of the gears of the variable speed transmission.

It has for its object to provide simple and effective mechanism for pneumatically shifting the gears.

A further object of the invention is to provide clutch shifting means and to electrically connect the same with the controlling device of the pneumatic gear shifting mechanism, such that the operation of the clutch shifting mechanism is dependent upon the operation of the gear shifting mechanism. In other words, the two sets of mechanism are so related that operation of the pneumatic gear shifting mechanism simultaneously operates the clutch shifting mechanism to shift the clutch in the proper manner and at the proper time during the various shifting operations of the gears.

In furtherance of these objects, the invention consists in the novel features of construction and operation, as hereinafter described.

The invention is illustrated in the accompanying drawings, in which:—

Figures 1, 12, 13, 14, 15, 16, 17:
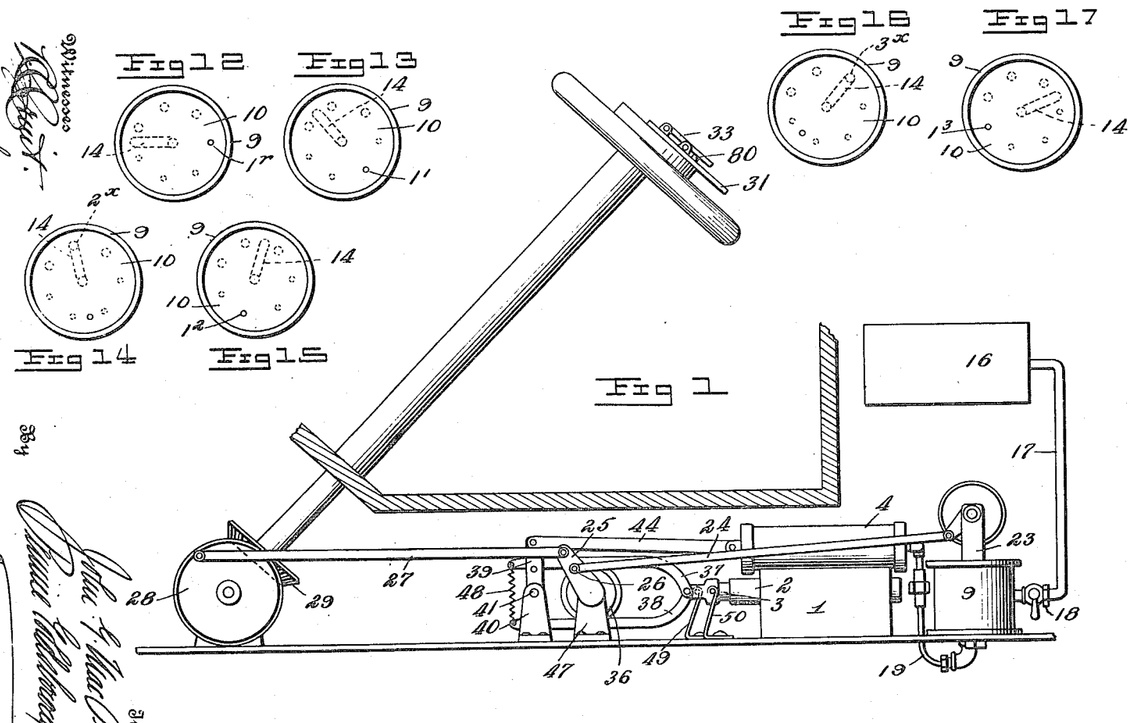
Figure 1 is a side elevation, partly in section, of the improved gear shifting mechanism, the same being applied to an automobile and illustrating the manner in which the controlling means for the mechanism may be associated with the steering mechanism of the automobile.
Figs. 12 to 17, inclusive, represent the various positions which the valve is caused to assume in order to effect the various shifting movements of the gears.
Figure 2:
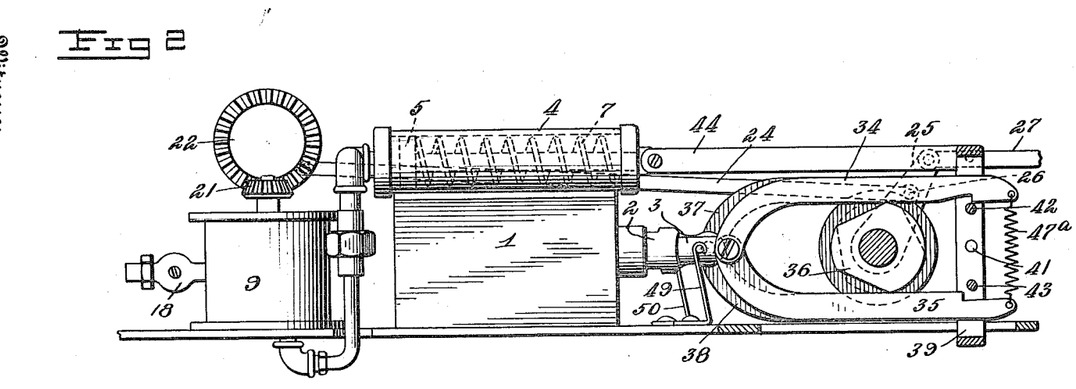
Fig. 2 is an enlarged side elevation of a portion of the gear shifting mechanism.
Figure 3:
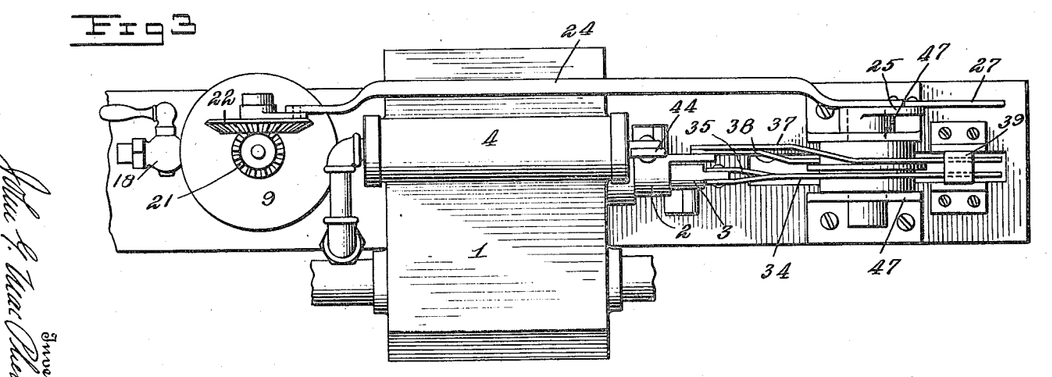
Fig. 3 is a top plan view of the construction shown in Fig. 2.

Referring to the drawings, and particularly to Figs. 1, 2 and 3, the gear box, in which the sliding or shiftable gears are located, is shown at 1. The gears are shifted in the well-known manner by means of a cylindrical sleeve 2 and a co-axial rod 3 telescoping therewith. A movement of the rod 3 to the right, in Figs. 2 and 3, throws the proper gears in mesh to cause the motor to propel the vehicle backward. This, therefore, is the "reverse" position of the parts. A movement of the same rod 3 to the left, in Figs. 2 and 3, causes the proper gears to mesh to propel the vehicle at the lowest or "first" speed. A movement of the sleeve 2 to the right, in Figs. 2 and 3, shifts the gears to cause the vehicles to be propelled at intermediate or "second" speed, and a movement of the same sleeve 2 in the opposite direction, or to the left, in Figs. 2 and 3, shifts the gears to such a position that the vehicle is propelled at high or "third" speed. In Figs. 2 and 3, the sleeve 2 and rod 3 are shown in their intermediate or neutral positions in which the gears in the gear box assume such a position that they are ineffective for transmitting power from the motor to the vehicle. This construction and operation of the gear shifting parts so far described is well known and requires no further explanation. In order to effect the above described movements of the sleeve 2 and rod 3 to shift the gears in the gear box 1 pneumatically by the present improved shifting mechanism, a cylinder 4 is provided, the exact location of which is immaterial, but preferably, is mounted directly on the gear box 1. The cylinder 4 is supplied with compressed air by the mechanism to be hereinafter described, and when so supplied by a quantity of compressed air, a piston 5 mounted in the cylinder is actuated and moved from the position shown in Fig. 2 to the right. A piston rod 6 is connected to the piston head 5, and co-axially disposed with respect thereto, is a coil spring 7 interposed between the piston 5 and the end of the cylinder 4, and tends to maintain the piston in the position shown in Fig. 2. Each time the piston 5 is moved to the right from the position shown in Fig. 2, either the sleeve 2 or rod 3 associated with the gear box is shifted in the proper direction to shift the gears in the manner above described, and to effect these various unlike movements of the sleeve 2 and rod 3 by the successive similar movements of the piston 5, a selective system of levers is employed, which will be hereinafter described.

Figure 10:
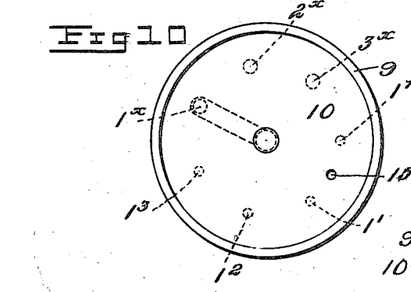
Fig. 10 is a more or less diagrammatic plan view of the valve employed for controlling the supply of compressed air to the pneumatic gear shifting mechanism.
Figure 11:
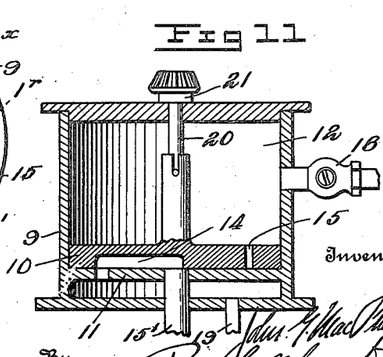
Fig. 11 is a vertical section through the valve shown in Fig. 10.

The valve mechanism for admitting compressed air to the cylinder 4 to effect movement of the piston 5 comprises a valve casing 9, (see particularly Fig. 11), and a rotary disk-like valve 10 mounted therein. The valve 10 turns upon a seat 11, which is in the form of a partition dividing the valve casing into upper and lower compartments 12 and 13, respectively. The partition or valve seat 11 is provided with a series of circularly arranged openings or ports, as best shown in Fig. 10. A radial passage 14, in the form of a recess, provided on the under surface of the valve 10, serves to place any one of a series of relatively large openings $1^x$, $2^x$, $3^x$ in communication with a central exhaust passage 15', which has no communication with the lower air compartment 13. Arranged in alinement with the passage 14 is a circular port 15 passing completely through the valve and adapted to register with any one of a series of relatively small openings $1^r$, $1^1$, $1^2$ and $1^3$ arranged in the valve seat 11. As will be noted in Fig. 10, however, none of the openings in the valve seat is exactly diametrically opposite the corresponding oppositely disposed opening; therefore, when the passage 14 places one of the openings $1^x$, $2^x$ and $3^x$ in communication with the central passage 15', the opening 15 will not be in registry with one of the openings $1^r$, $1^1$, $1^2$ or $1^3$, and when the opening 15 is registering with one of the ports $1^r$, $1^1$, $1^2$ or $1^3$, the extremity of the passage 14 lies between two adjacent openings $1^x$, $2^x$ or $3^x$, and is, therefore, ineffective for placing any one of these passages in communication with the central passage 15'. The upper compartment 12 of the valve casing is placed in communication with a suitable source of air supply, such as the air tank 16 by means of a conduit 17. A valve 18 may be interposed in the length of the conduit 17 to cut off communication between the tank 16 and the valve, when so desired. The lower compartment 13 of the valve casing communicates, by means of a conduit 19, with the cylinder 4. The central passage 15' communicates with the atmosphere and, therefore, when the passage 14 places any one of the ports $1^x$, $2^x$ or $3^x$ in communication with the passage 15', the air may be exhausted from the cylinder 4 through the conduit 19, compartment 13, passage 14, and thence through the central passage 15' to the atmosphere. When the opening 15 of the valve registers with any one of the openings $1^r$, $1^1$, $1^2$ or $1^3$, the compressed air in compartment 12 passes through opening or port 15 through the opening in the valve seat with which it registers, and thence through the conduit 19 to the cylinder 4, where it actuates the piston 5.

The valve 10 is actuated by means of a stem 20 which passes through the top of the valve casing and carries a beveled pinion 21. The beveled pinion 21 meshes with a beveled gear 22, which may be mounted upon an upstanding portion 23 on the valve casing. The beveled gear 22 is actuated by means of a link 24, (Figs. 1, 2 and 3), operatively connected at one end to said beveled gear and at its opposite end to a rock arm 25, the pivotal connection between the link 24 and rock arm being shown at 26 in Fig. 2. Oscillating movements of the rock arm 25, therefore, serve to turn the beveled gear 22, and hence actuate the valve through the intermediary of the beveled pinion 21 and the stem 20. In addition to this function, the rock arm 25 also serves to actuate the cam mechanism hereinafter described. The rock arm 25 is connected, by means of a link 27, (Fig. 1), to a beveled gear 28 meshing with a beveled pinion 29, which may be carried by a cylindrical sleeve 30 associated with the steering post of the automobile. As will be seen in Fig. 18, this sleeve is co-axially disposed with respect to the steering post and passes to a central point of the steering wheel, where it is connected to a lever 31 which coöperates with a notched segment 32, represented in Fig. 19. The lever 31 pivotally carries an auxiliary clutch-controlling lever 33, the purpose of which will be hereinafter described. By imparting turning movements to the lever 33, it is obvious that the lever 31 may be turned, thus turning the sleeve 30 and the pinion 29 to effect longitudinal movements of the link 27, which, in turn, actuates the rock arm 25.

By the construction so far described, it is obvious that the turning of the lever 31 on the steering wheel back and forth to successive positions will effect, through the connections above described, a turning movement of the valve 10 to either supply the cylinder 4 with compressed air, or to place the cylinder in communication with the atmosphere and thereby permit the spring 7 to return the piston 5 to its normal position.

Figures 4, 5:
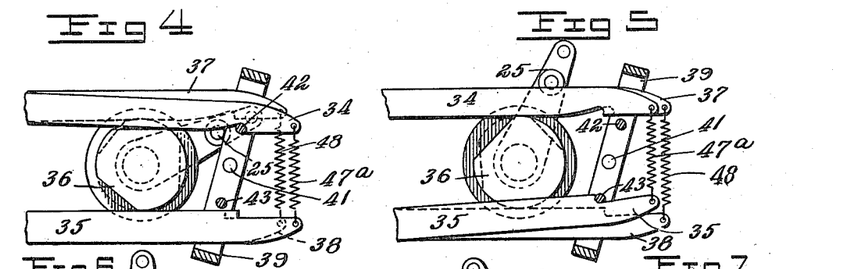
Figs. 4 to 9, inclusive, show the different positions to which the cam mechanism, hereinafter referred to, is shifted and the different positions to which the levers, hereinafter mentioned, are shifted by the movements of the cam mechanism.
Figures 6, 7:
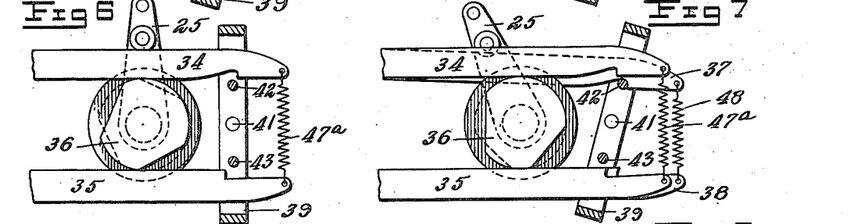
Figures 8, 9:
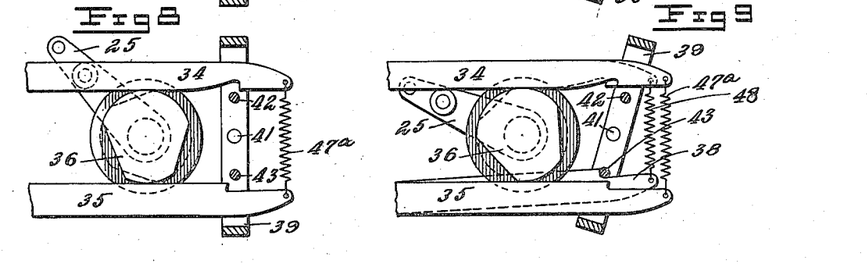

In order to cause the gears to be properly shifted at each actuation of the piston 5, the following construction is preferably employed: The inner gear shifting rod 3 pivotally carries two levers 34 and 35, each of which is preferably offset, as shown, so as to be capable of actuation by a centrally arranged cam mechanism denoted generally by the reference character 36. The gear shifting sleeve 2 carries two similar levers 37 and 38 which are also offset and are adapted to be actuated by the cam mechanism 36. The extremities of all of the levers 34, 35, 37 and 38 project through a skeleton rock lever 39, which is pivoted intermediate its ends to a suitable upright 40, as shown at 41 in Fig. 1. The two levers 34 and 37 project through the upper portion of the rock lever 39 above the pivoted point 41, while the two levers 35 and 38 project through the lower portion of the rock lever 39 below the pivot point 41, as clearly shown in Fig. 4. The rock lever 39 carries two transverse pins 42 and 43, that shown at 42 being located above the pivot point 41, and that shown at 43 being located below the pivot point 41. The extremities of the two lower levers 35 and 38 are notched, as best shown in Fig. 5, while the extremities of the two upper levers 34 and 37 are notched, as best shown in Fig. 4. The piston 5 is connected by means of a link 44 to the rock lever 39, so that every time compressed air is admitted to the cylinder 4, the rock lever 39 will be shifted from its normal perpendicular position to the position shown in Fig. 4. Now it is obvious that if all of the levers 34, 35, 37 and 38 are so held that their notched extremities cannot engage with the pins 32 and 33, the rocking movement of the lever 39 will have no effect upon said levers 34, 35, 37 and 38. The cam mechanism 36, hereinbefore referred to, is provided so as to hold the levers out of engagement with said pins 42 and 43 at certain times, while at other times permitting only one of the levers to come into engagement with one of the pins 42 and 43, while the remaining levers are held out of engagement with the pins. Therefore, that lever which is in engagement with the pin will be acted upon as the rock lever 39 swings around its pivot 41, and, therefore, serve to properly shift the gears. This cam mechanism comprises two adjacent cams 45 and 46 mounted to turn in suitable uprights 47. The cams 45 and 46 are connected directly to the rock arm 25, hereinbefore described, so that when said rock arm actuates the valve, it will also turn the cams 45 and 46. The lever 37 projects over the cam 45 and the lever 38 projects under it, while the lever 34 projects over the cam 46 and the lever 35 projects under it. The intermediate portions of the levers are normally held in operative engagement with the cam mechanism by means of a spring 47 connecting the two levers 34 and 35, and a spring 48 connecting the two levers 37 and 38. The cams 45 and 46 are each provided with a plurality of dwells and depressions adapted to successively throw all of the levers 34, 35, 37 and 38 out of engagement with the pins 42 and 43, and to throw only one of the levers into engagement with one of the pins 42 and 43. This may be readily understood froms Figs. 4 to 9. Referring first to Fig. 2, the dwells and depressions on the cams are so formed that in the position of the rock arm 25, shown in Fig. 2, all of the levers will be held out of engagement with the pins 42 and 43. The rock arm 25 assumes this position when the control lever 31—33 on the steering wheel is in the position shown in Fig. 19. The valve 10 is so set that in this position of the rock arm 25, the passage 14 will assume the position shown in Fig. 10, in which the port 1$^x$ is in communication with the exhaust passage 15′. This position of all the parts corresponds to the main "neutral" position. Now, if the control lever 31—33 be moved from the position shown in Fig. 19 until a detent 31$^x$, carried by the lever 31, registers with a notch $r$, the rock arm 25 will be shifted to the position shown in Fig. 4, and this movement of the rock arm will first serve to shift the cam mechanism until the lever 34 is lowered so that its notched extremity is in position to be engaged by the pin 42. All the rest of the levers will be held in their inoperative positions by the cam mechanism. The same movement of the rock arm 25 which so shifted the cams, will, through the intermediary of link 24, turn the valve until the port 15 therein registers with the opening 1$^r$ in the valve seat. In this position of the valve, the passage 14 will assume the position shown in Fig. 12. Air is thus admitted from the compartment 12 to the compartment 13, and from there through the conduit 19 to the cylinder 4 to shift the rock lever 39 from its normal perpendicular position to the position shown in Fig. 4. As the rock lever 39 is shifted, the lever 34, which is the only lever in engagement with one of the pins 42 and 43, will be moved longitudinally, thus shifting the rod 3 to the right (Fig. 3) and throwing the gears into reverse position. When the control lever 31—33 is moved back to the position shown in Fig. 19, the passage 14 of the valve again places the cylinder 4 in communication with the atmosphere, and the spring 7 returns the piston to its normal position. The rock lever 39, therefore, returns to its normal perpendicular position. Due to the shape of the notch in the extremity of the lever 34, the pin 42 will leave the same, but the gears are returned to their normal position by means of a leaf spring 49 acting upon the gear shifting rod 3. If the lever 31—33 be moved from the position shown in Fig. 19 until the detent $31^x$ engages in or registers with the notch $n'$, the rock arm 25 will be shifted from the position shown in Fig. 2 to the position indicated in Fig. 5. In this position of the rock lever 25, the valve will be moved from the position shown in Fig. 10 to the position shown in Fig. 13. In this position of the valve, the opening 15 in the valve registers with the opening $1^1$ of the valve seat, thereby permitting another supply of compressed air to actuate the piston 5 and again shift the rock lever 39. The movement of the rock arm 25, however, has so turned the cam mechanism as to bring a depression of the cam 46 adjacent the lower lever 35, and permit the same to assume the position shown in Fig. 5, in which it is in operative relation with the pin 43. All the other levers, however, are held out of engagement with the pins 42 and 43. The actuation of the piston this time will, therefore, effect a longitudinal movement of the lever 35, and as this lever is also connected to the gear shifting rod 3, the latter will again be shifted by this second operation. This time, however, it will be moved in the opposite direction, as the lever 35 is moved to the left (Fig. 2), and hence the rod 3 will be moved to the left (Fig. 3), where as in the operation above described, it was moved to the right. When the rod 3 is so actuated by the second operation, the gears will be shifted for first speed. If the control lever 31—33 be moved from the notch $n^1$ to the notch $n^2$, the rock lever 25 will move from the position shown in Fig. 5 to the position shown in Fig. 7, but before it reaches the position shown in Fig. 7, the cams will first assume the position shown in Fig. 6, in which position of the cams, the valve 10 will assume the position shown in Fig. 14. In this position of the valve, the cylinder 4 is in communication with the atmosphere, and, therefore, in passing from the notch $n^1$ to the notch $n^2$, the valve will first be shifted to place the cylinder in communication with the atmosphere, thereby permitting the spring 49 to return the gears to neutral position, and said valve 10 will then be moved to the position shown in Fig. 15, the valve assuming this position when the notch $n^2$ is reached. Compressed air will then be supplied through the port 15 and the opening $1^2$ with which it registers to the cylinder to effect shifting of the gears for second or intermediate speed. This time, the lever 37 is permitted to drop, as shown in Fig. 7, and, therefore, when the rock lever 39 is shifted to the position shown in Fig. 7 by the movement of the piston 5, the sleeve 2 will be shifted to the right in Fig. 3, as said lever 37 is connected to said sleeve 2. This will shift the gears for second or intermediate speed. Likewise, in moving the controlling lever 31—33 from the notch $n^2$ to the notch $n^3$, the rock lever 25 will first be passed to the position shown in Fig. 8, in which all the levers are held out of engagement with the pins 42—43 and in which the valve assumes the position shown in Fig. 16, placing the cylinder 4 in communication with the atmosphere and said rock lever 25 will then pass to the position shown in Fig. 9, in which the lever 38 is permitted by the cam mechanism to come into operative relation with the pin 43. In the position of the rock lever 25 shown in Fig. 9, the valve assumes the position shown in Fig. 17, but before it reaches this position, the passage 14 places the opening $3^x$ in communication with the exhaust passage 15', as shown in Fig. 16, thereby first permitting the gears to return to neutral position by allowing the piston 5 to return to normal position, and a spring 50 similar to the spring 49 and acting upon the sleeve 2, returns the sleeve 2 to normal position. In the ultimate position of the valve shown in Fig. 17, the air is permitted to pass through opening 15 in the valve and through port $1^3$ with which it registers to the cylinder 4, thus actuating the rock lever 39, in the manner above described, to shift the lever 38 (Fig. 9) to the left in the drawing, which, in turn, moves the gear shifting sleeve 2 to the left and throws the gears in high speed or third speed position. This third speed position is the normal running position of the parts, and, therefore, the parts will stay if desired in the position just described until the vehicle is stopped, at which time, the control lever 31—33 may be returned to any one of the intermediate positions in which the passage 14 of the valve places the cylinder 4 in communication with the atmosphere, or it may be returned to the main neutral position shown in Fig. 19, in which the cylinder 4 is also in communication with the atmosphere.

In the above description of the operation of the gear shifting mechanism, the necessary shifting movements of the clutch were neglected to make the operation of the gear shifting mechanism clearer. It is obvious, however, that each time the gears are shifted the clutch must be "thrown out," and when the gears are shifted to the desired position, the clutch must be reëngeged until the vehicle has attained sufficient speed to permit another shifting movement of the gears. Means is provided in the present instance for automatically effecting the shifting movements of the clutch, as diagrammatically represented in Fig. 18. The cone member of the clutch is shown at 51, and is normally held out of engagement with its coöperating member 52 by means of a lever 53, a piston rod 54 guided by a bracket 55, and a spring 56 interposed between said bracket and a stop 57 carried by the piston rod 54. The piston rod 54 carries a piston 58 mounted in a pneumatic cylinder 59 to which air is admitted by means of a conduit 60 from the air supply tank 16. The air is exhausted from the cylinder 59 by means of a conduit 62 and a valve denoted generally by the reference character 63 is adapted to either place the cylinder 59 in communication with the tank 16, or to place the cylinder 59 in communication with the atmosphere. When air is admitted to the cylinder 59, the clutch is slowly engaged, and when air is exhausted from the cylinder 59, the spring 56 disengages the clutch. This pneumatic clutch controlling mechanism as just described forms the subject matter of a co-pending application, Serial No. 845,673, filed June 17, 1914. In the present instance, the clutch controlling mechanism is electrically controlled by means of the lever 31—33. For this purpose, the auxiliary clutch controlling lever 33 is pivoted to the lever 31, as above described, and is connected to an actuating rod 64 passing through the steering post of the automobile. The lower end of the rod 64 carries a circular recessed collar 65, with the recess of which the fork 66 of a bell-crank lever 67 coöperates in such a manner that the rod 64 may be turned when the lever 31 is turned, and when said rod 64 is moved longitudinally by the lever 33, the collar 65 will shift the bell-crank lever 67 about its pivotal connection 68. One arm 69 of the bell-crank lever constitutes an electrical switch which may coöperate with a segment of insulating material 70 carrying two electrical contacts 71 and 72. A spring 73 is interposed between a collar 74 secured to the rod 64 and the pinion 29, so that the spring tends to hold the lever 33 in its raised position, that is, in the position shown in Fig. 18, and tends to hold the electric switch 69 in the position shown in full lines in Fig. 18. When the lever 33 is depressed to raise the rod 64, the electric switch 69 swings to the position shown in dotted lines in Fig. 18. Before it reaches this position, however, it first makes contact with the contact 72, thereby completing an electric circuit through a source of current supply 73, leads 74 and 75 and electro-magnet 76. The magnet 76 is thus energized, but as will hereinafter be seen, an armature 77 connected to the valve 63 is already in contact with the core of magnet 76, and, therefore, the energization of the magnet 76 will have no effect upon the position of the armature 77, and hence, the valve 63. The switch 69, however, before reaching the dotted line position shown in Fig. 18, completes an electric circuit through the contact 71, lead 78 and electro-magnet 79. The magnet 79 is thus energized and attracts the armature 77, thus turning the valve 63 to such a position that communication between the air tank 16 and the cylinder 59 is cut off and communication established between the cylinder 59 and the atmosphere. It will be seen, therefore, that when the switch 69 completes an electric circuit through the contact 71, the clutch will be disengaged. When the lever 33 is allowed to be returned to its normal position by the spring 73, the switch 69 swings from the dotted line position in Fig. 18 to the full line position, and in so doing, first passes the contact 71, but as the armature 77 is already attracted by the magnet 79, the passing of the contact 71 will have no effect on the armature 77 or the valve 63. As the switch 69 passes the contact 72, however, the armature 77 will be attracted to the position shown in the drawings, and air will again be supplied to the cylinder 59 to engage the clutch. It will be noted that in either the engaged or disengaged position of the clutch, the switch 69 passes completely by the contacts 71 and 72, and, therefore, the current does not continue to flow through either magnet in either position of the armature 77. It will also be noted that the clutch is disengaged by depressing the lever 33 and when said lever 33 is caused to assume its raised position by the spring 73, the clutch will be reëngaged.

Figures 18, 19:
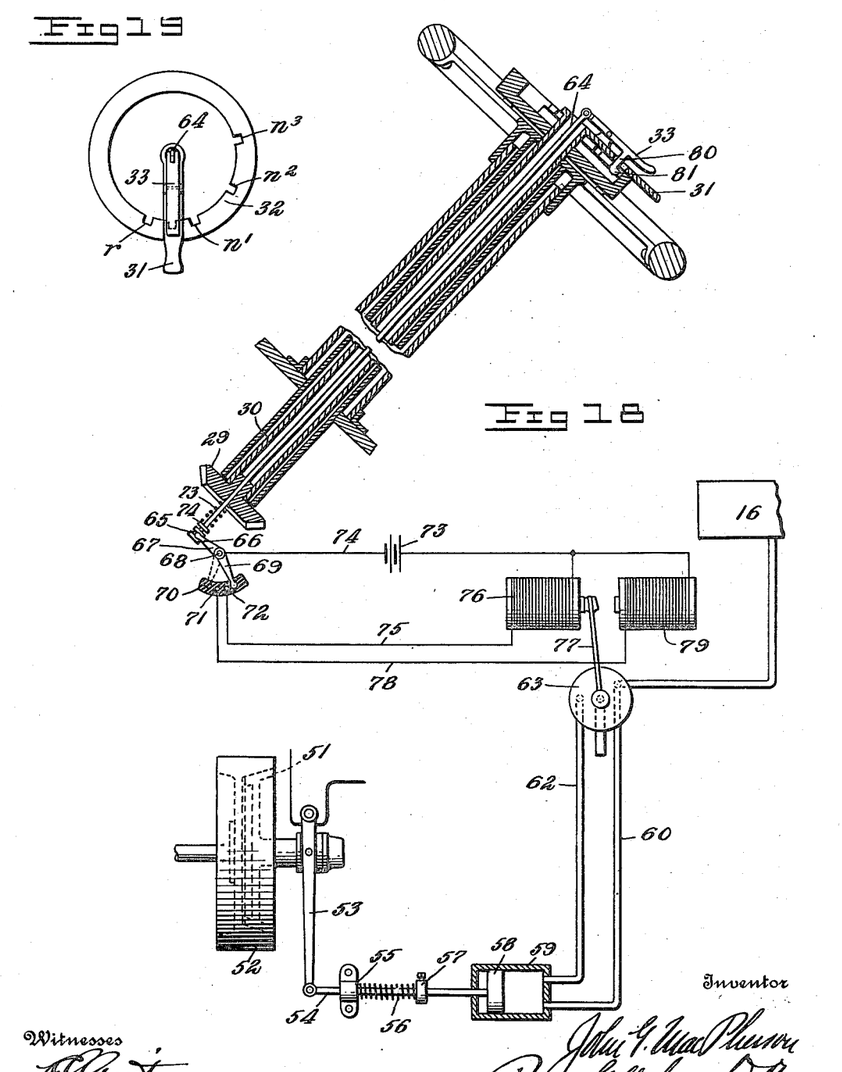
Fig. 18 is a more or less diagrammatic and schematic view showing the clutch shifting mechanism and the manner of electrically connecting it with the controlling means of the gear shifting mechanism so as to cause the controlling means of the gear shifting mechanism to operate the clutch mechanism.
Fig. 19 is a plan view of the controlling lever for the pneumatic gear shifting mechanism and its coöperating segment on the steering wheel.

It is obviously advantageous to positively prevent the clutch from being engaged during shifting of the gears, and it is also advantageous and desirable to prevent shifting of the gears while the clutch is engaged. This is accomplished by providing a depending pawl 80 on the lever 33, as best shown in Fig. 18, which pawl has a projecting tooth portion 81 adapted to engage the under side of the segment 32 during movement of the lever 31 between the notches shown in Fig. 19. When the tooth 81 of the pawl 80 registers with one of the notches shown in Fig. 19, the lever 33 will be allowed to rise, as the spring 73 tends to hold the lever in its raised position. When the pawl 80 so engages in one of the notches shown in Fig. 19, obviously the gear shifting lever 31 cannot be turned. In order to turn the lever 31 to shift the gears, the lever 33 must first be depressed to move the pawl 80 out of its notch, and when the lever 31 is then turned, the tooth 81 will engage the under side of the segment and hold the lever 33 depressed. As above stated, the gears do not assume their ultimate shifted position until the lever 31 registers with one of the notches shown in Fig. 19, and as the clutch-control lever 33 is held depressed in all positions of the lever 31 between the notches, it, therefore, follows that the clutch will be positively held out of engagement as the lever 31 is moved from one notch to the next. When the lever 31, however, registers with one of the notches, the notch will permit the lever 33 to be raised by the spring 73 and the clutch will, therefore, be automatically thrown in or engaged.

Although it is desirable to positively hold the clutch out of engagement, as the lever 31 passes from notch $n^1$ to notch $n^2$, Fig. 19, and from notch $n^2$ to notch $n^3$, it is not desirable to positively hold the clutch out in the main neutral position of the lever, that is the position shown in Fig. 19 between notch $r$ and notch $n^1$. As above stated, the lever assumes this position when the vehicle is standing still, and in order to make the gears mesh, it is sometimes necessary to throw in the clutch in order to spin the gears until the teeth thereof will mesh. In order to permit this, an extra notch is provided between notches $r$ and $n^1$, so that the lever 33 will be permitted to rise, and thereby engage the clutch.

Assuming the vehicle to be at rest, and the lever 31 in the position shown in Fig. 19, it is first necessary to depress the lever 33, which action will disengage the clutch. If the lever 31 then be shifted to the notch $r$, the gears will be thrown in reverse position, and when the notch $r$ is reached, the lever 33 will be permitted to rise, thereby automatically engaging the clutch. The vehicle in this position of the gears will be propelled backward. When it is then desired to propel the vehicle forwardly, the lever 33 is depressed, which action disengages the clutch and the lever 31 is shifted until it registers with the notch $n^1$. This notch will permit the lever 33 to rise, thereby automatically engaging the clutch. When the lever 31 registers with the notch $n^1$, the gears will have been shifted to first speed position. Following this operation, it will be seen that in shifting from any speed to the next higher or lower speed, it is only necessary to depress the clutch shifting lever 33, which action disengages the clutch, and then to turn the lever 31 until the next notch is reached. In passing to this next notch, the pawl 80 will engage the under side of the rack and positively hold the lever 33 down, and thereby positively hold the clutch out of engagement, but when this next notch is reached, the spring 73 will be permitted to reëngage the clutch as the lever 33 is allowed to rise. As the lever 31 cannot be turned while the pawl 80 is engaging in one of the notches, it is obvious that the gears cannot be shifted until the lever 33 is first depressed, thereby disengaging the clutch. The clutch is, therefore, always disengaged when the gears are shifted and is positively held out of engagement during shifting of the gears and can only be engaged when the gears are in their shifted positions. Furthermore, the gears cannot be shifted while the clutch is engaged, as the lever 33 is always raised when the clutch is engaged, and, therefore, locked against movement.

Obviously numerous modifications and changes may be made in the details of construction, without departing from the spirit or scope of the invention, as defined in the accompanying claims.

What I claim is:—

1. The combination with the gear shifting members of a motor vehicle, of pneumatic means to actuate the same, selective connections between said pneumatic means and said gear shifting members to cause the former to produce proper movements of the latter, manually operable means to select the proper connections between the pneumatic means and the gear shifting members to produce the desired shifting of the gears, a valve to control the supply of compressed air to said pneumatic means, and means whereby the actuation of said manually operable means actuates said valve.

2. The combination with the gear shifting members of a motor vehicle, of pneumatic means to actuate the same, selective connections between said pneumatic means and said gear shifting members to cause the former to produce proper movements of the latter, manually operable means to select the proper connections between the pneumatic means and the gear shifting members to produce the desired shifting of the gears, a valve to control the supply of compressed air to said pneumatic means, and mechanical connections between said manually operable means and said valve whereby the actuation of said manually operable means actuates said valve.

3. The combination with the gear shifting members of a motor vehicle, of pneumatic means to operate the same, controlling means therefor, selective connections between the pneumatic means and the gear shifting members, controlling means for said connections, said last-named controlling means adapted when actuated to actuate said first-named controlling means, and means under the control of the driver of the vehicle to actuate said last-named controlling means.

4. The combination with the gear shifting members of a motor vehicle, of pneumatic means to actuate the same, a valve to successively supply compressed air to and exhaust it from said pneumatic means, selective connections between said pneumatic means and said gear shifting members to produce proper operative movements of the latter each time compressed air is admitted to the pneumatic means, controlling means for said connections and means whereby actuation of said controlling means produces substantially simultaneous operation of said valve.

5. The combination with the gear shifting members of a motor vehicle, of single acting pneumatic means to actuate the same, a plurality of normally inoperative levers between said pneumatic means and said gear shifting members, and means to render any one of said levers operative to produce proper movement of one of said members from said pneumatic means.

6. The combination with the gear shifting members of a motor vehicle, of single acting pneumatic means to actuate the same, a plurality of normally inoperative levers between said pneumatic means and said gear shifting members, and cam mechanism to shift the positions of said levers and render one of the same operative to produce proper movement of one of said members from said pneumatic means.

7. The combination of power actuated gear shifting mechanism, power actuated clutch shifting mechanism, electrical means to control the operation of the clutch shifting mechanism, manually operated means to control the gear shifting mechanism, and means automatically operative during operation of said manually operated means to control said electrical means.

8. The combination of power actuated gear shifting mechanism, power actuated clutch shifting mechanism, electrical means to control the operation of the clutch shifting mechanism, and mechanical controlling means to permit actuation of said electrical means only in timed relation with the operation of the gear shifting mechanism.

9. The combination of power actuated gear shifting mechanism, power actuated clutch shifting mechanism, electrical means to control the operation of the clutch shifting mechanism, manually operated means to control said gear shifting mechanism and said electrical means, and controlling means associated with said manually operated means for permitting actuation of the gear shifting mechanism to shift the gears only when the clutch is disengaged, and permitting the electrical means to be operated to shift the clutch only when the gears have assumed their shifted positions.

10. The combination with the gear shifting members of a motor vehicle, of fluid operated means to actuate the same, a plurality of normally inoperative levers between said fluid operated means and said gear shifting members, and means to render any one of said levers operative to produce proper movement of one of said members from said fluid operated means.

In testimony whereof I affix my signature, in presence of two witnesses.

JOHN G. MacPHERSON.

Witnesses:
  ARTHUR L. BRYANT,
  VERNON T. HOUGHTON.